US012237690B2

(12) United States Patent
Miller (10) Patent No.: US 12,237,690 B2
(45) Date of Patent: Feb. 25, 2025

(54) SYSTEM AND METHOD OF COLLECTING ENERGY UTILIZING A MANAGEMENT SYSTEM FOR AN ENERGY COLLECTION DEVICE, FOR COLLECTING, MANAGING, AND DISCHARGING ENERGY

(71) Applicant: ATLAS POWER TECHNOLOGIES INC., Abbotsford (CA)

(72) Inventor: Mitchell B. Miller, Mission (CA)

(73) Assignee: Atlas Power Technologies Inc., Abbotsford (CA)

( * ) Notice: Subject to any disclaimer, the term of this patent is extended or adjusted under 35 U.S.C. 154(b) by 835 days.

(21) Appl. No.: 16/614,910

(22) PCT Filed: May 7, 2018

(86) PCT No.: PCT/CA2018/050539
§ 371 (c)(1),
(2) Date: Nov. 19, 2019

(87) PCT Pub. No.: WO2018/213921
PCT Pub. Date: Nov. 29, 2018

(65) Prior Publication Data
US 2020/0161895 A1  May 21, 2020

(30) Foreign Application Priority Data
May 23, 2017 (CA) .................................. 2967707

(51) Int. Cl.
*H02J 50/00* (2016.01)
*H02J 7/14* (2006.01)

(52) U.S. Cl.
CPC .......... *H02J 50/005* (2020.01); *H02J 7/1415* (2013.01); *H02J 50/001* (2020.01);
(Continued)

(58) Field of Classification Search
CPC ........ H02J 50/001; H02J 50/005; H02J 50/10; H02J 7/1415; H02J 2207/50; H02J 2300/20; H02J 2310/40; H05F 7/00
See application file for complete search history.

(56) References Cited

U.S. PATENT DOCUMENTS 7,439,712 B2  10/2008  McCowen
7,478,712 B2   1/2009  McCowen
(Continued)

FOREIGN PATENT DOCUMENTS

IN         211679      11/2006

*Primary Examiner* — Richard Isla
*Assistant Examiner* — Johali A Torres Ruiz
(74) *Attorney, Agent, or Firm* — Damien G. Loveland; Valuetech Patent Agency Inc.

(57) ABSTRACT

A system and method of collecting energy utilizing a management system for an energy collection device, for collecting, managing, and discharging energy. Management system creates an active collection, storage, and discharging device; diffusion circuits allow for controlling the collecting, and discharging of harvested charges to precisely set requirements; the circuit allows for maximized charge collection over a given time, by minimizing the collection devices resistance to collection, the reduction in resistance is a factor calculated using the inverse square law, to allow ultra high speed maximized transitions in the charging, and discharging oscillation cycle.

9 Claims, 7 Drawing Sheets

(52) U.S. Cl.
　　CPC ....... *H02J 2207/50* (2020.01); *H02J 2300/20* (2020.01); *H02J 2310/40* (2020.01)

(56) References Cited

U.S. PATENT DOCUMENTS

| | | | |
|---|---|---|---|
| 8,686,575 B2 | 4/2014 | McCowen | |
| 8,810,049 B2 | 8/2014 | McCowen | |
| 9,331,603 B2 | 5/2016 | McCowen | |
| 9,479,086 B2 | 10/2016 | McCowen | |
| 2001/0052731 A1* | 12/2001 | Petrenko | H05B 3/84 307/10.1 |
| 2004/0149734 A1* | 8/2004 | Petrenko | H05B 3/84 219/538 |
| 2007/0273206 A1 | 11/2007 | McCowen | |
| 2010/0220424 A1* | 9/2010 | Ibok | H05F 7/00 361/117 |
| 2013/0084474 A1 | 4/2013 | Mills | |
| 2014/0042270 A1* | 2/2014 | Lai | H05F 7/00 244/1 A |
| 2016/0043661 A1* | 2/2016 | McCowen | H02N 1/002 310/310 |
| 2018/0026553 A1* | 1/2018 | McCowen | H02N 1/10 290/1 R |
| 2018/0041143 A1* | 2/2018 | Coleman, Jr. | H02N 11/008 |

\* cited by examiner

SYSTEM AND METHOD OF COLLECTING ENERGY UTILIZING A MANAGEMENT SYSTEM FOR AN ENERGY COLLECTION DEVICE, FOR COLLECTING, MANAGING, AND DISCHARGING ENERGY

TECHNICAL FIELD

The present disclosure is generally related to energy and, more particularly, is related to systems and methods for collecting energy, for storage, or use with a load.

BACKGROUND

The concept of harvesting energy from the atmosphere was first pioneered in the early 1900's. It has been intensely studied for more than a century with varying level of results but with one common conclusion to this date, and that is; that this technology has not been proven to be commercially viable.

Those skilled in the art have focused on the obvious results attained by the potential difference in voltage that increases linearly with distance from the Earth's surface to the ionosphere and upper atmosphere. The patents issued and the inventions claimed consists of soaring exorbitant structures, high reaching sky-scraping aerials such as tethered balloons, towers, suspensions over valleys, and masts. Many of these spectacular designs are inherently flawed, and the inventors failed to grasp the engineering and cost requirement challenges associated with creating these exorbitant structures.

Existing methods to capture this energy focus on features of the collecting aerial. Though this area of science has been intensely studied, it has always remained as what is considered fringe science, because of this fact it has not seen the investment that other areas of power production have seen. The foundational scientific principles still remain somewhat in their infancy, because of this fact, the focus has been on how to gain a charge from the atmosphere, and increase that charge.

SUMMARY

Technical Problem

Existing methods to capture atmospheric energy focus on features of the collecting aerial. The charges are allowed to build up to a desired, or break down voltage, or maximum voltage of a collection device, then exit the system via a switch, spark gap, transformer, or combination or connection to a load.

As is clear with even the most recent developments in the art, those skilled in the art have not been able to realize a method to extract commercially viable quantities of atmospheric energy in an effective manner. As such development efforts continue to focus on the process of collecting the energy, or trying to guess what process will actually make harvesting these charges commercially viable, by attempting to patent a wide variety of components without any recognizable system, or assembly, to facilitate a viable device, other than a strictly passive collection system. Instead have resorted to expanding lost prior art, by including current components in vaguely described circuit arrangements that lack in describing function or purpose, because of this fact there has not previously existed a desire for the development of a managing system for collected charges.

There have been many schemes to try and collect atmospheric energy, with one of the most common being that of a configuration including a spark gap and transformer, this system traditionally used to attempt to create a continuous output resonance. In order for this to be accomplished a high potential must be built up in a storage device or inductor, this high potential causing an ever-increasing resistance against migrating charges that are attempting to migrate into the storage device or inductor, and thus slowing down the charge migration instead of using an active system designed specifically to be charged to the absolute minimum required in order for a charge to be collected and discharged, and in the process do usable work. These previous schemes have failed to create a method facilitating the maximum charge migration, and thus have been incredibly limited to the actual amount of power able to be collected, over a defined period of time.

Existing methods do not use a management system to control the input and output characteristics of a collection device, and the charging and discharging circuit, and it's components. This leaves previous schemes very limited in regards to their charging and discharging abilities. More specifically, they do not contain the complex architecture, and advancements contained herein needed to facilitate a collection device discharging at a high frequency rate, taking advantage of a low initial resistance when charging a capacitor or another storage device. Those skilled in the art have been able to clearly demonstrate that there are large quantities of usable energy available in the atmosphere, even though they have not been able to realize a means to collect, store, and manage this power source to make it a continuous, commercially viable form of power production.

Solution to Technical Problem

There is a certain level of predictability when harvesting atmospheric charges, and by knowing how to identify this predictability, you can then utilize a management system to control the harvesting, storage, and output of this energy source, which can be used as a continuous source of commercial scale power production.

This method uses a managing collecting, storage, and discharge system hereinafter referred to as "management system" defined as; to handle, direct, govern, or control in action or in use, the device and it's functions, processes, actions, tasks, activities, systems, and given or directed instructions, the input and output characteristics of charging and discharging circuits, oscillation cycles, memory, controls, and components.

It contains the specifically designed complex architecture, and advancements needed to facilitate managing an energy collecting device collecting charges then storing the collected charges, and then discharging collected charges; at a controllable high frequency rate, taking advantage of the low initial resistance when charging a capacitor, or another storage device, that can be replicated and controlled to an extremely high number of pluralities, to maximize charge migration from a collection device, or conductive material into a storage device. With this method charges, and voltages of virtually any potential can be managed, by a management system, to create a commercially viable electrical power production device.

The concept of harvesting atmospheric electricity, static charge, and the voltage potentials thereof, are well known and have been studied intensely. Different methods to harvest this energy in a useful usable manner to this date have proven to have no commercial success. Voltage potentials have been studied and reflect that as you increase in height linearly from the surface of the earth, to the upper atmosphere, potentials can reach hundreds of thousands of volts. Voltage potentials are just that, potentials, even though they can result in transferring a charge, this charge is an intense brief dissipation, and sustaining this charge has been the challenge for the last century.

The theory of harvesting this energy mostly centers around the concept that tiny particles or radiations are bombarding the atmosphere continuously. In order to harvest these particles a conductive material must be placed in the atmosphere to collect these particles, and that the height of the conductor in the atmosphere effects the time it takes to gain a charge. Even the most current developments in the art still focus around this theory, and because of this they have exclusively focused on the aerial part of the device.

I have discovered that even though higher voltages can be measured at higher elevations, these voltage potentials do not convert into a higher flow of current under traditional operating conditions, as resistance is applied to a harvesting device, the device progressively causes the work potential of the harvester to drop, to the point of no current flowing. I have discovered that if resistance is minimized, and that dependent on the voltage potential of the harvesting unit, directly proportion to elevation, and the energy density of the area the harvesting unit is located in, a great deal of charges and current will continue flowing. If you accumulate these charges in a capacitor, the initial charge rate will be maximized as the capacitor charges up to the harvester's potential voltage. The charge rate will continue to decrease until ultimately stopping altogether at the equilibrium of the voltage potential.

I have also discovered that the path of current must be designed with the utmost care, the current path must not be too broad as it travels through the accumulation device, or capacitor. If the current path is too broad, meaning multiple conduction paths from a higher density to a lower density, charges can migrate without the storage device gaining the benefit of a rise in voltage potential. Additionally, if this path is too narrow then accumulation may happen too quickly, this can in some circumstances limit the ability of the system to discharge larger volumes of current.

The preferred management system as described herein uses a designed harvesting configuration, this harvesting configuration is described as the process of electromagnetic energy diffusion, or electromagnetic diffusion for short. The electromagnetic diffusion harvesting circuit configuration hereinafter called "diffusion circuit", is a main component of this method that is managed by the management system.

There is a difference in potential and electromagnetic density from the surface of the earth to the atmosphere. The differential increases linearly with elevation. In order to create a usable source for this potential, a path must be constructed to allow charges to migrate from a higher potential to a lower potential, and somewhere in this path a device must be inserted in order to tap into this migration of charges. This device needs to allow for the accumulation of charges, and this accumulation of charges needs to tap into this higher potential, or voltage that when a circuit is connected to the device the potential can be used to flow through a resistance to create usable work.

This stored higher potential can be considered a break in the circuit, with the higher potential being described as + positive and a lower potential being described as − negative. To establish this break in the circuit and create an area of higher potential a number of devices may be used including; rectifying diodes, transistors, capacitors, vacuum tubes, solid state current controlling devices which are defined as; an electrical component that can be used to create two different electrical potentials, and or polarities, and control current in a circuit, avalanche diodes, solid-state semiconductors, liquid state semiconductors, bridge rectifier's with rectifying diodes configured as a bridge rectifier being preferred.

When connecting one AC input on a bridge rectifier to the conductor with higher potential, for instance an aerial connection, and the other AC input on the bridge rectifier to a conductor with a lower potential, for instance the ground (the AC input being the section on the bridge rectifier where two opposite sides of two rectifying diodes meet), you can establish a voltage difference between the positive and negative connection leads on the bridge rectifier (the two sections where two like sides of the rectifying diodes meet).

The voltage differential is dependent upon a few factors including the amount of conductive material that is elevated in our atmosphere, the electromagnetic density of it's surroundings, the amount of conductor in the earth, or the difference of two different electromagnetic densities. It is also dependent on the resistance of the exposed conductor and the angular direction of the conduction path with relation to the starting point and final migration point. That being the straightest and most direct path will create the highest potential difference in the rectifier. This is believed to be the case because of the natural high frequency of this charge migration, which varies. I have studied this phenomenon and believe the frequency to be in the range of 500 to 800 kHz. I have witnessed that if the angle of a conductor along the migration path is directed to alter more than 45° off a direct path the voltage potential will drop substantially. This is also the case if a conductor is used that does not direct the migration into a concentrated path, as would be the case if using too wide of a sheet of conductive material.

I believe this dramatic drop in potential is because at an atomic level this natural high frequency allows charges to vibrate the atoms of conductors, giving them the ability to travel out of the conductor if the path gains resistance. If the conduction path is directionally altered, charges push on other migrating charges, and then vibrate the atomic structure of the conductor, which forces their way free into the surrounding environment, of a lower electromagnetic density or potential than at the starting point.

In order to use the potential voltage located on the positive and negative terminals of the bridge rectifier, it is important to consider resistance, if resistance is increased the migrating charges will force their way out of the conductor, and no current will flow through the bridge rectifier, which means no voltage potential will be created. If no voltage potential can be created because of this resistance, no usable work can be obtained, as well no buildup of charges can occur.

With consideration to these factors the ideal construction of this diffusion circuit uses charging devices that allow a high rate and speed of charging and discharging, to capture charges and force a voltage increase with traditional devices such as capacitors, batteries, and inductors with capacitors of appropriate value being preferred.

In order to gain the highest amount of usable power it is important to charge and then discharge the capacitor with the lowest resistance possible. This is then self-explanatory that as charges are accumulated in the capacitor, the amount of resistance is increased as well. In order to maximize both the time rate of charging, and the actual power output a number of control devices or switches, and storage devices such as capacitors must be inserted into the circuit controlled by the management system. The management system then determines and controls the charging of capacitors, then isolating the capacitors, and discharging the capacitors, by sending signals to the control devices or switches, that open and close the charging and discharging circuits.

The management system then determines and controls a number of diffusion circuits connecting them in series and or in parallel in order to take a very low voltage potential of the accumulators, and bring the output voltage up to a level that can create a high side potential voltage or voltage differential. This high voltage potential will allow current to flow out of the harvesting unit and do usable work. The benefit of this charge and discharge cycle is the charging cycle can operate by only minimally charging each accumulator, giving each diffusing circuit the least amount of resistance, and in effect maximize the amount of charge migration for collection.

If the speed of charging of the capacitors, is to a defined voltage and is calculated accurately and then combined in series and/or parallel to the desired output voltage, then the charging and discharging cycle can be maximized by a management system, and with this can operate in the extremely high frequency range from megahertz to gigahertz and even to terahertz. Operating the device with this method, the output power can reach levels of commercial viability.

In order for the management system to gain these frequency levels solid state semiconductors are preferred, requiring in this case amplifying transistors, or field effect transistors, and a small input power controlled by a management system to allow the high-frequency switching and output power amplification.

Additionally, lower switching speed can also result in usable power being attained, which may be desired in certain circumstances. This can be accomplished by using mechanical devices such as relays, reed switches, reed relays, or commutators, which can utilize a rotary or mechanical movement action. For instance a commutator(s) as the switching device, utilizing arrangements of contact points or brushes, to allow charging and discharging, which could be fitting to existing rotating components like a driveshaft of a vehicle, or airplane jet engine. This rotary means can be greatly beneficial in certain circumstances where existing rotary or other consistent motions exist, and could be fitted with a mechanical switching device that would then not necessarily require an input current for operation, for certain control switching devices. This output can then be routed and further controlled by an electronic management system to sense output current and voltage, and then control and regulate the delivery of this current to a load or storage device.

The load is a target of the power supply, it is illustratively an electric device that is to be put into action by supplying electric power. It should be noted that the Power generating system may be configured to be connected to a commercial power system so as to be able to collaborate with it, or may be configured to independently to operate without collaborating with a commercial power system.

Advantageous Effects of the Invention

Management system is an active collection, storage, and discharging device, it allows automation of collection devices using predetermined conditional targets, and algorithms to allow ultra high speed maximized transitions, in the charging and discharging oscillation cycle.

Management system "learns" from historical measurements, and determines environmental effects on a collection device to determine, the "best case" output voltage, and amperage rates and characteristics as a reciprocal of a diffusion circuit, or diffusion cluster time rate of charging.

Management system allows natural environmental charge harvesting to reach the level of commercial viability as a continuous source of utility scale power production, and allows for controllable output power characteristics.

Diffusion circuit is a breakthrough for creating an active energy collecting device and management system, the circuit allows for controlling the collecting, and discharging of harvested charges to precisely meet set requirements; the circuit allows for maximized charge collecting over a given time, by minimizing the collection devices resistance to collection, the reduction in resistance is a factor calculated using the inverse square law.

BRIEF DESCRIPTION OF DRAWINGS

The invention will be described by reference to the detailed description of the preferred embodiment and to the drawings thereof in which.

DETAILED DESCRIPTION

Therefore, a heretofore, unaddressed need exists in the industry to address the aforementioned deficiencies and inadequacies.

Figures and embodiments contained are to demonstrate possible variations and to give a clearer understanding of the theory and method herein, to allow one with ordinary skill in the art to gain the ability to re-create said method.

Figure 1:
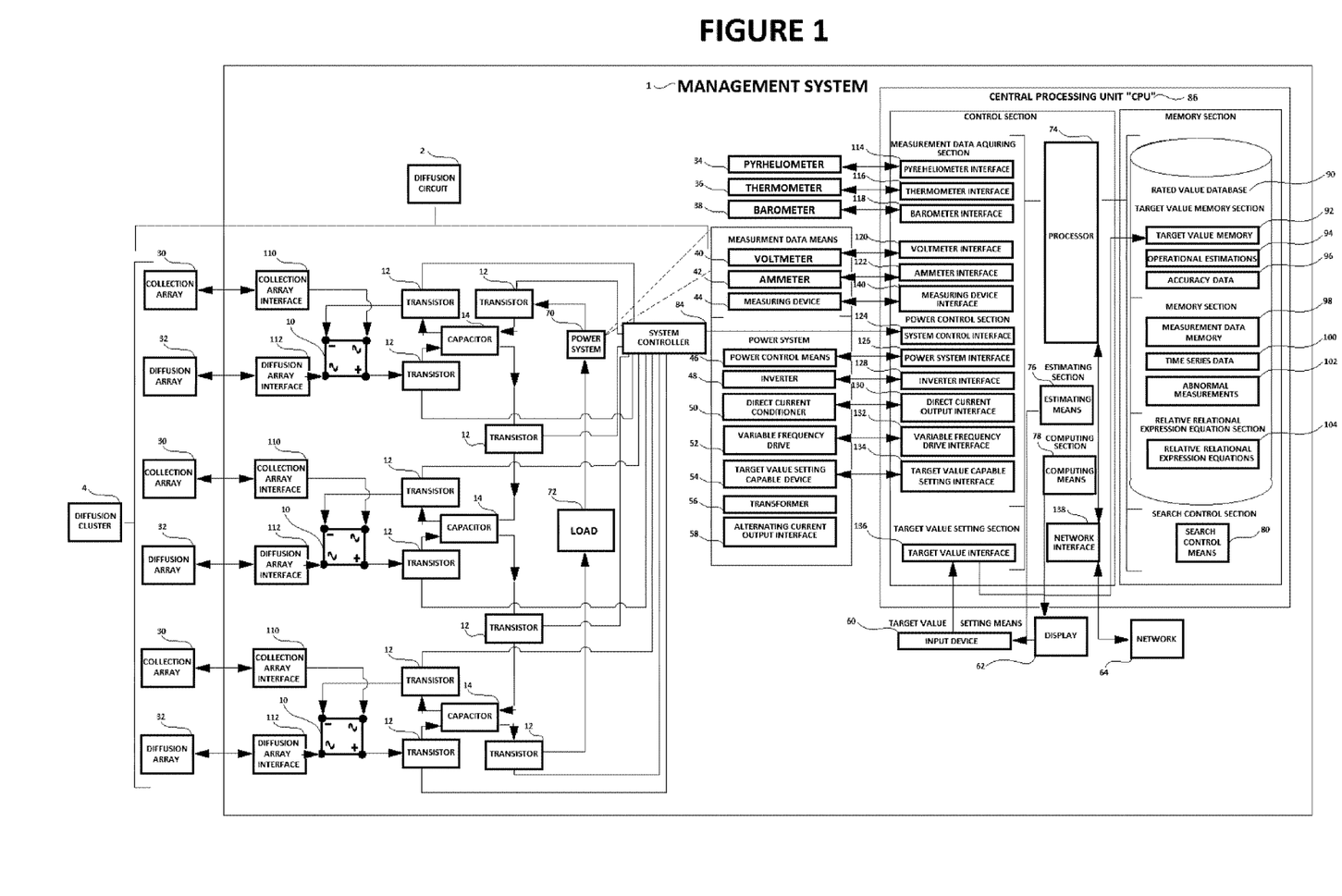
FIG. 1 illustrates a preferred embodiment and the various operations of the management system.

The management system with reference to FIG. 1 is a functional block diagram schematically showing a configuration of the management system 1, it's diffusion circuit 2, it's power system section, it's central processing unit "CPU" 86, which includes the control section and the memory section.

Embodiments of the present disclosure can also be viewed as providing systems and methods for managing collecting energy, this can be briefly described in architecture one embodiment, among others, can be implemented by;

FIG. 1 illustrates the preferred embodiment of the system of managing collecting energy comprising, a circuit configuration controlling the collection and output of charges, controlled by the management system 1, hereinafter referred to as the "diffusion circuit" 2. Wherein exposed charge collecting conductive material located in an area of higher potential of charges hereinafter called "collection array" 30, for simplicity, uses conductive wires 20 elevated vertically into the atmosphere, which may be any conductive material, and exposed charge diffusing conductive material located in an area of lower potential of charges hereinafter called "diffusion array" 32, for simplicity uses conductive wires 20 grounded directly downward into the Earth, which may be any conductive material, are electrically connected to a bridge rectifier's 10 alternating current input "AC" leads, or a polarity, or potential charge separator, such as rectifying diodes, transistors 12, capacitors 14, vacuum tubes, solid state current controlling devices, avalanche diodes, solid-state semiconductors, liquid state semiconductors, with a bridge rectifier 10 being preferred.

This configuration allows a continuous migration of charges, this migration of charges causes a voltage differential or potential difference in the bridge rectifier's 10, positive and negative leads. Additionally, the bridge rectifier's 10, positive and negative leads are connected to an electronic switching device, in this case a transistor 12, which could be any number of different types or styles of transistors, thyristor, or layered semi-conductive material designed for electronically controlled switching, for each charging lead which then connect to the positive and negative leads of a capacitor 14, accumulator, or storage device. In a preferred embodiment of the method, a capacitor 14, is used to store a charge. The input and output of each capacitor 14, are then connected to separate output transistors 12, which could be any number of different types or styles of transistors, thyristor, or layered semi-conductive material designed for electronically controlled switching, with all transistors 12, controlled by a CPU 86, or microcontroller, embedded microprocessor, integral controller, derivative controller, system-on-a-chip, digital signal processor, transistor oscillation circuit, semiconductor oscillation circuit, silicone controlled rectifier, triac, field programmable gate array, or paired with an existing CPU 86, in a non-limiting example of a master and slave configuration of the management system 1. The CPU 86, is controlled by a computer code or script, embedded system, or artificial intelligence, that tells the system controller 84, to send a signal to the first set of transistors 12, to begin the charging of the capacitor 14, by activating the two transistors 12, connected to the positive and negative leads of the bridge rectifier 10, and creating a completed circuit, which is considered the first half of the oscillation cycle. The CPU 86, then sends a new instruction to the system controller 84, to send a signal to the second set of transistors 12, to begin discharging of the capacitor 14, and then arrange other capacitors in combinations, either in series or in parallel, which is considered the second half of the oscillation cycle.

This oscillation cycle can discharge through a load 72, or another storage device to create usable work, additionally the discharge cycle can be electrically connected to a transformer 56, that can modify the output current, and voltage if needed. The CPU 86, and system controller 84, then dictate the frequency of the charge and discharge cycle, and the combinations and arrangements of additional diffusion circuits 2, and diffusion clusters (multiple diffusion circuits), hereinafter referred to as "circuit clusters" 4, to gain the desired voltage level and total current output. Arrangements and oscillation frequency of capacitors 14, may include instantaneous oscillations, predetermined storage levels before oscillation, voltage measurement based storage discharge, continuous sampling and adjustment of current output, and additionally can be arranged to meet virtually any desired and defined frequency with available diffusion circuits 2, and diffusion clusters 4, this output can then be used to do desired work or for storage.

Each diffusion circuit 2, is an electrically connected system of components, and is managed by the management system 1, which may include additional devices and systems such as; a display 62, a direct current power conditioner 50, current power output interface 130, a pyrheliometer 34, pyrheliometer interface 114, a thermometer 36, a thermometer interface 116, a barometer 38, a barometer interface 118, voltmeter 40, voltmeter interface 120, an ammeter 42, an ammeter interface 122, a measuring device 44, a measuring device interface 140, an inverter 48, an inverter interface, a system controller 84, a system controller interface 124, power control means 46, power system interface 126, a target value setting capable device 54, a target value capable setting device interface 134, an input device 60, a target value interface 136, an alternating current output interface 58, a transformer 56, a variable frequency drive 52, a variable frequency drive interface 132, a central processing unit "CPU" 86, a processor 74, estimating means 76, computing means 78, network interface 138, load 72, search control means 80, relative relational expression equations 104, abnormal measurement memory 102, time series data memory 100, measurement data memory 98, accuracy data memory 96, operating estimations data 94, target value memory 92, a rated value database 90, collection array 30, collection array interface 110, diffusion array 32, diffusion array interface 112.

The control section serves to control the overall control and operation of various components of the management system 1, diffusion circuit 2, diffusion clusters, and the memory section serves to store information. The control section is configured to include a measurement data acquiring section (measurement data acquiring means), the amount of current/voltage (current/voltage acquiring means), a computing section (computing means), a target value setting section (target value setting means), a search control section (search starting means), power system section (power system controlling means), and in estimating section (estimating means). Further, the memory section is configured to include a target value memory section, a memory section, and a relative relational expression equation section, a rated value database.

The memory section serves to store, as measurement data 98, measurement data obtained from each measuring instrument while the management system 1 is operating. Specifically, the measurement data contains the following measured values measured at the measure point of time, operating current value, operating voltage value, amount, and temperature, atmospheric pressure, solar radiation. The measure point of time is data representing year, month, day, hour, minute, and second. Further, the operating current value and the operating voltage value refer to values of an electric current and voltage measured at a point, respectively.

Further, solar radiation, temperature, and atmospheric pressure is measured by the pyrheliometer 34, thermometer 36, or the barometer 38, respectively. The rated value database 90, is provided with a memory section and a target value memory section. The memory section serves to store relative relational expression equations 104, for maintaining operating current values and operating voltage values. The target value memory 92 section, serves to store target values of the operational estimations 94, and accuracy of relative relational expression equations 96, that can be interpreted for command allocation.

The measurement data 98 acquiring section, serves to acquire measuring values from each measurement instrument. Specifically, the measurement data acquiring section acquires measurement data 98 of (electrical power data, environmental data), which is time-series data 100, containing the electric current value, the voltage value, the temperature, the atmospheric pressure, from the measuring instruments of the ammeter 42 and voltmeter 40, the pyrheliometer 34, thermometer 36, and barometer 38, and sends the measurement data to the search control section 80 of the database.

The search control section 80, searches for relative relational expression equations 104, to interpret historical relations to measurement values 98, and interpret proportional relationships between stored measurement values 98, operational characteristics 94, and predetermined target value 98 ranges, including output characteristics, discharge cycle relational information including combinational arrangement output power data, cluster combination data, and duty cycle optimization equations.

The search control section 80, can compute measurement characteristics if measurements have been measured and stored even once and can compare characteristics with the target value setting section 92, which may also incorporate a learning effect, or artificial intelligence, interpretations can be interpreted by the central processing unit CPU 86, which can send instructions to the system controller 84, which can then send command signals to active switching and control systems, and components, to control predetermined, or instructed operational target values and functions.

The measurement data acquiring 96 section, also serves to determine faults, by acquiring and comparing measured values from the measurement data memory 98 storage section, and by interpreting operating system abnormal measurements 102. Abnormal measurements 102, are stored in the memory storage section, and additionally may be sent to the display 62, to indicate to users of the management system 1, abnormal measurements 102, or sent to the control section and the target value memory section 92, to perform tasks such as bypassing abnormally operating diffusion circuits 2, diffusion clusters 4, systems, or component's, or by compartmentalizing systems containing faults and maintaining predetermined target operating conditions, charging and discharging cycles, output power characteristics and functions.

It should be noted that measurements may be computed by performing measurements by measuring each instrument once, or more than once, at a time of introduction of the management system 1, or may be computed as a search performed manually by the user's operating the management system 1, or maybe performed automatically, e.g., regularly. In particular measurements may be performed at predetermined intervals, or from time to time.

Figure 2:
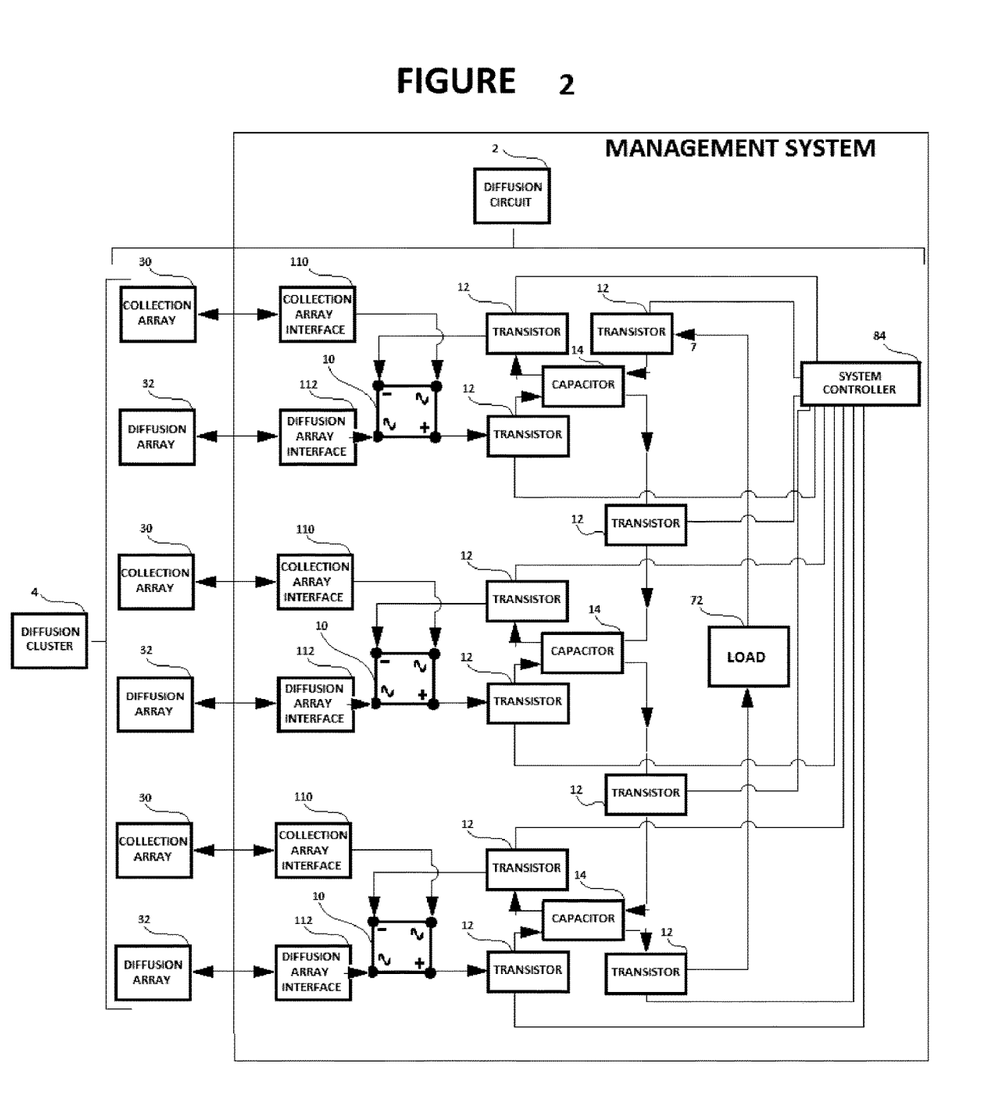
FIG. 2 illustrates a simplified method of the management system, with the diffusion circuit.

FIG. 2 illustrates an exemplified embodiment of the management system 1 comprising, a diffusion circuit 2 configuration and system controller 84, controlling the collection and output of charges, controlled by the system controller of the management system 1, hereinafter referred to as the "diffusion circuit" 2. Wherein exposed charge collecting conductive material located in an area of higher potential of charges hereinafter called "collection array" 30, for simplicity, uses conductive wires 20 elevated vertically into the atmosphere, which may be any conductive material, and exposed charge diffusing conductive material located in an area of lower potential of charges hereinafter called "diffusion array" 32, for simplicity uses conductive wires 20 grounded directly downward into the Earth, which may be any conductive material, are electrically connected to a bridge rectifier's 10 alternating current input leads, or polarity, or potential charge separator, such as rectifying diodes, transistors 12, capacitors 14, vacuum tubes, solid state current controlling devices, avalanche diodes, solid-state semiconductors, liquid state semiconductors, with a bridge rectifier 10 being preferred.

This configuration allows a continuous migration of charges, this migration of charges causes a voltage differential or potential difference in the bridge rectifier's 10, positive and negative leads. Additionally, the bridge rectifier's 10, positive and negative leads are connected to an electronic switching device, in this case a transistor 12, which could be any number of different types or styles of transistors, thyristor, or layered semi-conductive material designed for electronically controlled switching, for each charging lead. Which are then connect to the positive and negative leads of a capacitor 14, accumulator or storage device, in a preferred embodiment of the method, a capacitor 14, is used to store a charge. The input and output of each capacitor 14, are then connected to separate output transistors 12, which could be any number of different types or styles of transistors, thyristor, or layered semi-conductive material designed for electronically controlled switching, with all transistors 12, controlled by a system controller 84 or microcontroller, embedded microprocessor, integral controller, derivative controller, system-on-a-chip, digital signal processor, transistor oscillation circuit, semiconductor oscillation circuit, silicone controlled rectifier, triac, field programmable gate array, or paired with an existing CPU, in a non-limiting example of a master and slave configuration of the management system 1. The system controller 84, is controlled by a computer code or script, embedded system, or artificial intelligence, that tells the system controller 84, to send a signal to the first set of transistors 12, to begin the charging of the capacitor 14, by activating the two transistors 12, connected to the positive and negative leads of the bridge rectifier 10, and creating a completed circuit, which is considered the first half of the oscillation cycle. The CPU 86, then sends a new instruction to the system controller 84, to send a signal to the second set of transistors 12, to begin discharging of the capacitor 14, and arrange them in combinations, either in series or in parallel, which is considered the second half of the oscillation cycle.

This oscillation cycle can discharge through a load 72, or another storage device to create usable work, additionally, the discharge cycle can be electrically connected to a transformer 56, that can modify the output current, and voltage if needed. The system controller 84, then dictates the frequency of the charge and discharge cycle, and the combinations and arrangements of additional diffusion circuits 2, and diffusion clusters 4, to combine the capacitor(s) 14, outputs in series, and in parallel groups, to gain the desired voltage level and total current output. Arrangements and oscillation frequency of capacitor(s) 14, may include instantaneous oscillations, predetermined storage levels before oscillation, voltage measurement based storage discharge, continuous sampling and adjustment of current output, and additionally can be arranged to meet virtually any desired and defined frequency with available diffusion circuits 2, and diffusion clusters 4, this output can then be used to do desired work or for storage.

The benefit to this simpler system is it can be used in a wide variety of applications, including electronics, electronic devices, electrical equipment, lighting, vehicles and transportation and virtually all devices requiring operational power. The advantage being the ability of using embedded circuitry reducing the physical size and cost of each diffusion circuit 2, and diffusion cluster 4, which can be especially advantageous with electronic devices, lights, computers, tablets, cell phones, media players, watches, small motorized devices such as skateboards, hover boards, mopeds, motorized bikes, jet packs, water propulsion devices, radios, streetlights, flashlights, signs, information display screens, remote electronic equipment, and both permanent and non-permanent electronic devices, and other smaller less power consuming devices. Also, a human can act as a conductive material for charge collecting, the human conductor is standing on an insulating surface which maybe insulating shoes or other similar wearable coverings or insulating surfaces, making contact through it's conductive body with a collection array interface 112, in other embodiments the conductive contact could be built into devices, such as wearable technologies, smart glasses, headsets, earphones that act as the collection array 30.

Figure 3:
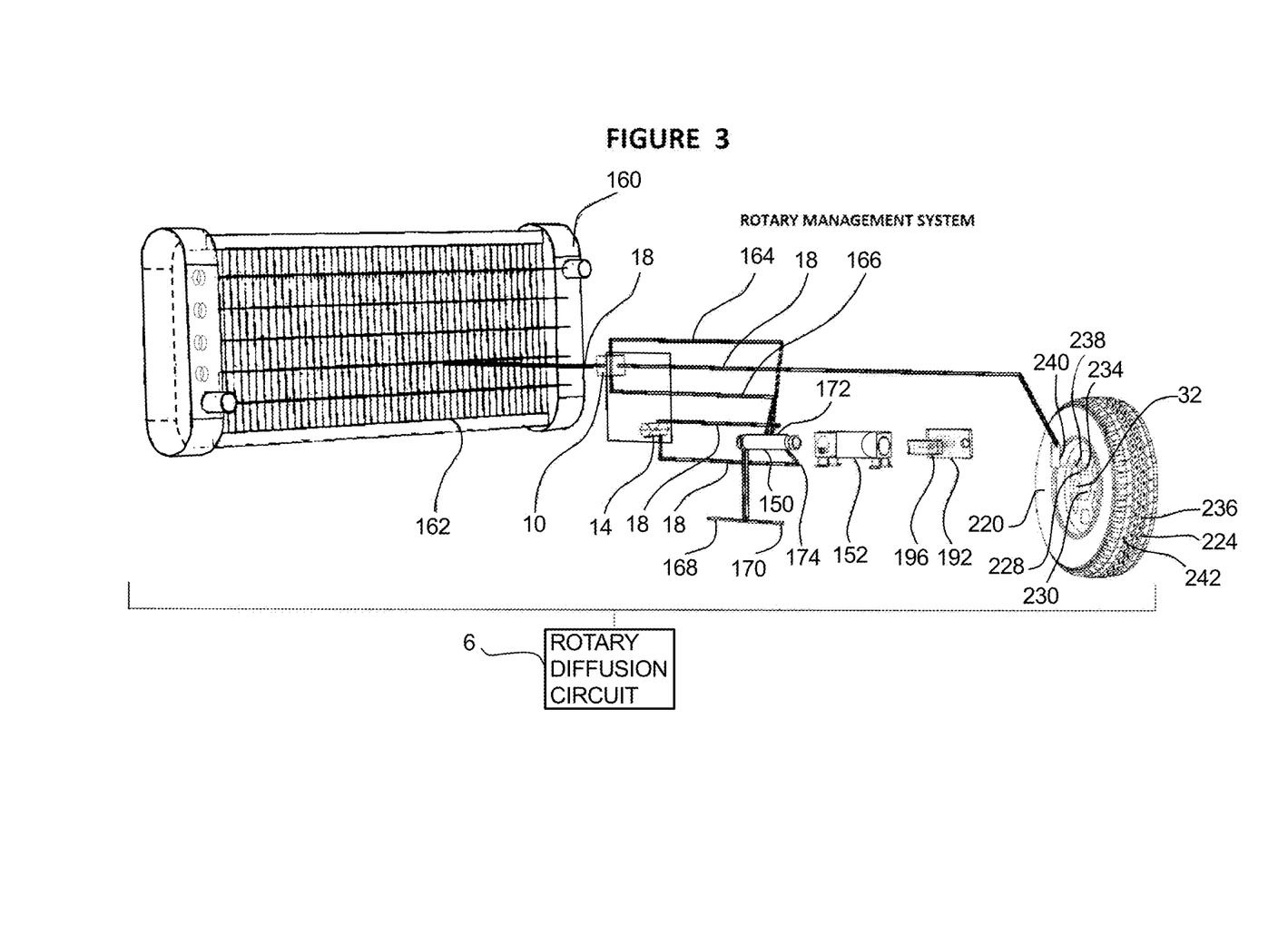
FIG. 3 illustrates an embodiment of rotary management system.

FIG. 3 illustrates an embodiment of rotary mechanical management system 82, hereinafter referred to as "rotary diffusion circuit" 6, that may also utilize a hybrid mechanical-electronic management system, as described herein. As the vehicle begins to drive, the charge collection radiator 160, is bombarded with electric charges that create a higher voltage potential in the charge collection radiator 160, the charges then migrate through an electrical connection into the full wave bridge rectifier 10 Alternating Current "AC" lead, and out the other AC lead on the full wave bridge rectifier 10, which is electrically connected to a hanging tether that makes a ground connection, or to a commutator that makes an electrical connection to the vehicle's tire 220, that has been made to be conductive or impregnated with conductive material 224, 236, 242.

The positive and negative leads on the full wave bridge rectifier 10, are electrically connected to commutator brush assemblies 192 mounted in the commutator brush housing 188. As the charges migrate they create a voltage differential, and potential difference is between the positive and negative leads of the full wave bridge rectifier 10; which makes contact through the commutator brush assemblies 192, the brushes 192, through the commutator 150, to the capacitor input line 172, and capacitor output line 174, to charge the capacitor(s) 14.

The bridge rectifier positive and negative leads connected to commutator brush assemblies 192, are controlled by a rotating commutator 150, that contact commutator bars. As the commutator 150 rotates, the commutator brush assemblies 192, make contact with alternating commutator bar configurations, one commutator bar configuration connects the leads of the capacitor 14, to the positive and negative leads of the full wave bridge rectifier 10, which charges the capacitor 14, this could be considered the first half of the oscillation cycle. The capacitor 14, then switches into a commutator bar discharge configuration as the commutator rotates, through the commutator brush assemblies 192, discharging the capacitor(s) in series and in parallel, through the commutator slip ring output 170, and commutator slip ring input 168, to gain a usable voltage, and complete a circuit, which can be considered the second half of the oscillation cycle. This output can then be routed through a power system 84, for voltage and current regulation, and into a load 72, or another storage device to create usable work.

This embodiment of a mechanical rotary management system 82, has the advantage that it can be installed to not require an input current to create the output current. In an embodiment, it is installed on an electric vehicle and uses forced atmospheric triboelectric diffusion, that forces air across the radiator 160 that acts as the conductive collecting material with a higher potential, and is electrically connected to the rotary mechanical management system 82, that is coupled to a spinning mechanical component like a vehicle drive shaft.

Each rotary diffusion circuit 6, can have a specific calculated oscillation cycle or be combined with an electronic management system (not shown) to control, and adjust the voltage, and current output, of the entire unit, which may consist of tens, hundreds, thousands, millions or even more individual rotary diffusion circuit's 6. Additionally, the electronic management system (not shown) can regulate and stabilize the output characteristics of the discharge cycle, which can be greatly beneficially used in for instance an electric car, vehicle, plain or other aircraft, helicopters, flying cars, jets, or spaceships, to provide a stable input power to the battery, to increase its life expectancy and robustness and capacity.

The commutator 150, rotation, mechanical device switching speed, or the transistor(s) (not shown), inputs and outputs, or another mechanical device such as a relay, thyristor, or layered semi-conductive material designed for electronically controlled switching, with all transistors (not shown), controlled by a system or paired with an existing CPU, controller or microcontroller, embedded microprocessor, integral controller, derivative controller, system-on-a-chip, digital signal processor, transistor oscillation circuit, semiconductor oscillation circuit, silicone controlled rectifier, triac, field programmable gate array, or paired with an existing CPU, in a non-limiting example of a master and slave configuration of the management system 1, which may additionally be controlled by a microprocessor, or microcontroller or embedded CPU controlled by a computer code or script, embedded system, or a non-limiting example of a master and slave configuration, controlled by the management system 1, which then dictates the frequency of the charge and discharge cycle and are arranged to combine the capacitor(s) 14, in series, and or in parallel, to gain the desired voltage level and total current output.

Rotary diffusion circuits 6, can be multiplied, with multiple bridge rectifier 10, or solid state current controlling devices, transistor (not shown), diode, vacuum tube cathode, and capacitor 14 systems, or combinations, which can and then combined, in both series and or parallel for discharging.

Additionally other areas of a vehicle may have conductive attributes, the vehicle may be coated with conductive paint, the windows may be conductively coated, and the fabric in the vehicle may be conductive, the interior may be conductively coated, the vehicles frame may be conductive, the vehicle may have conductive siding or conductive paint which could all be used to increase the amount of charge migration and as well the amount of charges able to be collected, and act as collection materials.

Another embodiment of this management system and method is implemented to benefit existing power production units by allowing charges to travel out of the generating unit at a lower voltage potential. When charges build up inside a generator unit they create a magnetic field, this magnetic field pushes back on the prime mover of the generator unit, causing an increased amount of workload. This pushing back force is called back electromagnetic, or electromotive force. Utilizing this management system, a generator can output current in the milli and micro volts and amps, by having the discharge of current at a lower potential causing the generating unit to operate with less workload, making the unit more efficient. Since the majority of current generating units are built on heat exchange systems, less fuel will be required to operate the generating units and the benefit to this is self-explanatory.

Figure 4:
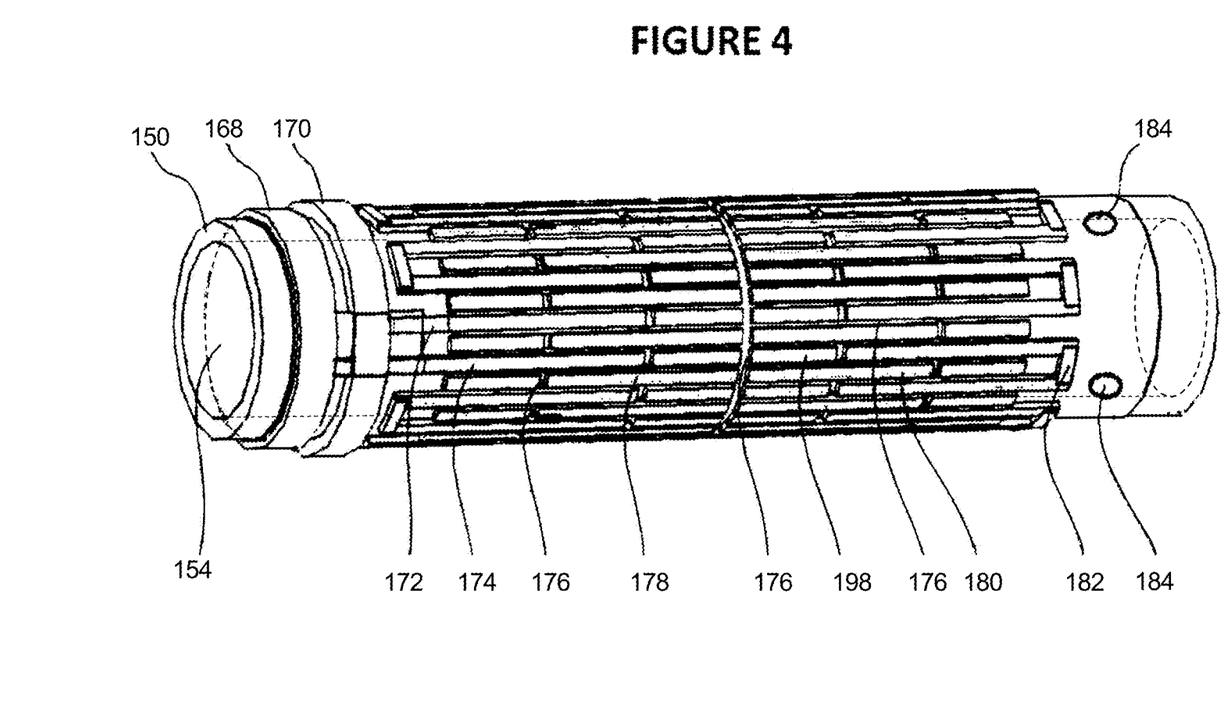
FIG. 4 illustrates a commutator as the switching mechanism for a rotary management system.

FIG. 4 illustrates a diagram showing a rotary commutator unit 150. As part of the rotary mechanical management system 1, commutator 150, connects to a rotating mechanical part via its coupling channel 154, and is held in place by the commutator fastener ports 184, and fasteners (not shown). As the commutator rotates, the collector input bar 178 and the collector output bar 180 form a circuit with the capacitor (not shown), via commutator brush assemblies (not shown); this circuit is the first half of the oscillation cycle. As the commutator rotates, the commutator brush assemblies (not shown) rotate to the next set of commutator bars which are the capacitor input line 172, and the capacitor output line 174, separated from the collector input bar 178, and the collector output bar 180 by commutator slots 176. This is the second half of the oscillation cycle, and all of the capacitors (not shown) then connect via the discharge series commutator connector bars 182, to complete the circuit with a load (not shown) via the commutator slip ring input 168, and commutator slip ring output 170, to complete the oscillation and charge discharge cycle. Though this embodiment is a rotational management system, a linear system is also possible as long as a consistent linear motion exists, this would therefore mean that the alternating commutator bar set up would be configured in a linear fashion.

Figure 5:
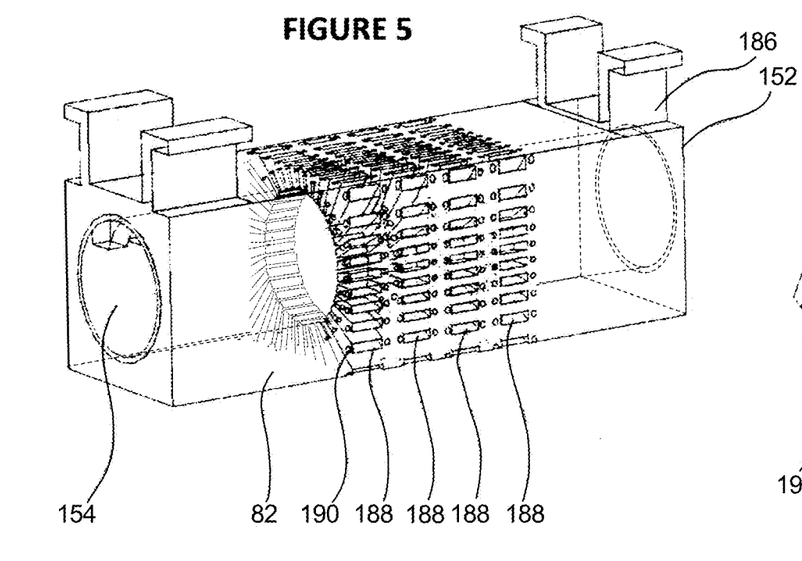
FIG. 5 illustrates a commutator housing.

FIG. 5 is an illustration of the commutator housing unit 152, that is held in place by the mounting brackets 186 this is mounted around a commutator (not shown) in the commutator chamber 154, this is another component of the rotary switching system 82, which is designed to hold the commutator brush assemblies (not shown), and the commutator brush housing's 188, the commutator brush assemblies (not shown) are held in place with fasteners (not shown) in the fastener ports 190.

Figure 6:
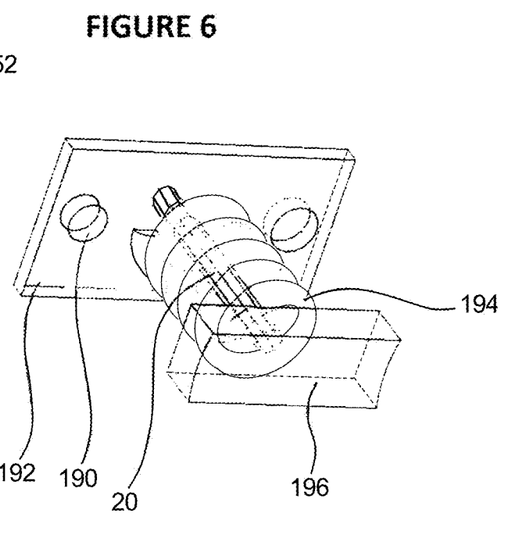
FIG. 6 illustrates a commutator brush assembly.

FIG. 6 is an illustration of the commutator brush assembly 192, which consists of the commutator brush 196, the commutator spring 194, the conductive wire 20, and the fastener ports 190 for the fasteners (not shown).

Figure 7:
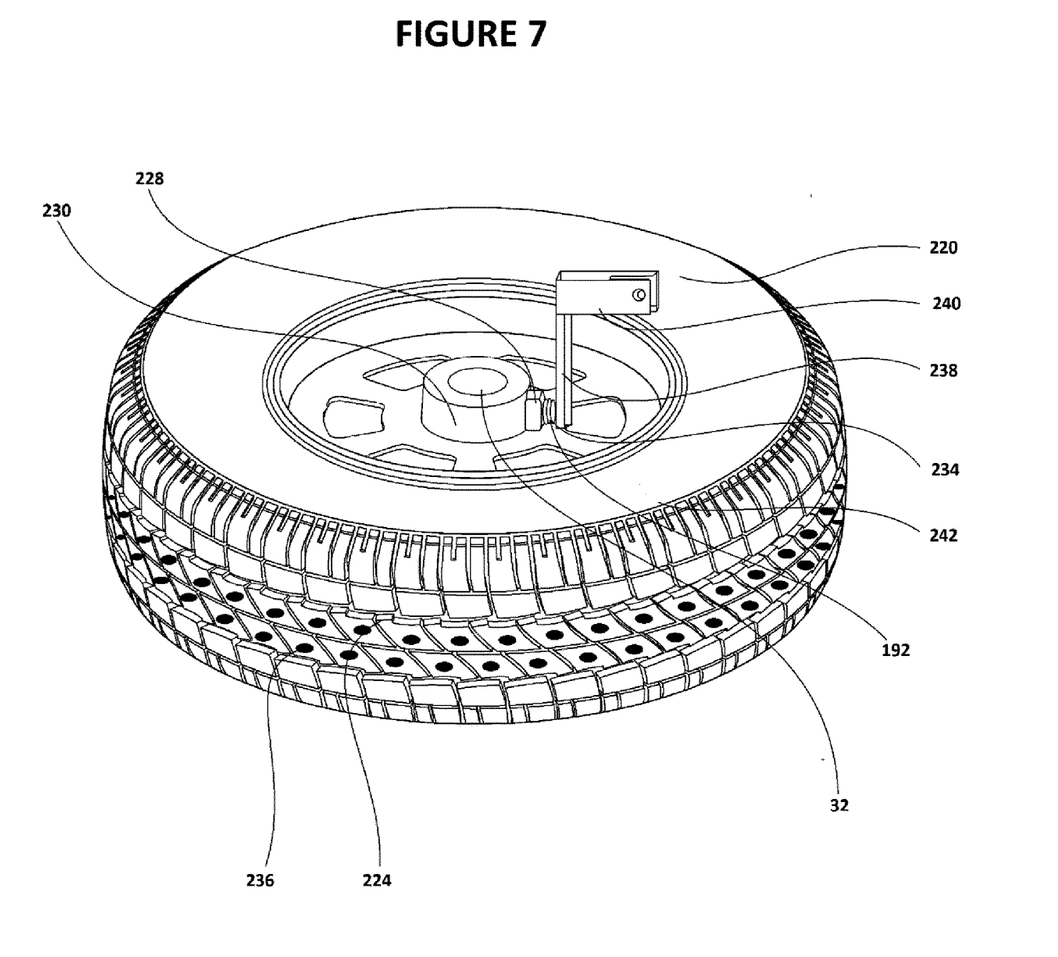
FIG. 7 illustrates a conductive tire and commutator assembly.

FIG. 7 is an illustration of the conductive tire 220, it consists of conductive material contacting the ground via conductive studs 236, a conductive strip along the tire 224, or the tire made of a conductive material 242, the tire can make direct contact with the frame with it's direct frame contact 232, or it can make contact as part of the rotary management system (not shown), via a commutator unit comprising mainly of commutator mounting bracket 240, the commutator housing 238, the commutator spring and wire assembly 234, a commutator brush to 228, and a tire commutator slip ring 230, this unit could be considered the conductive array with lower potential or defusing array 32.

Figure 8:
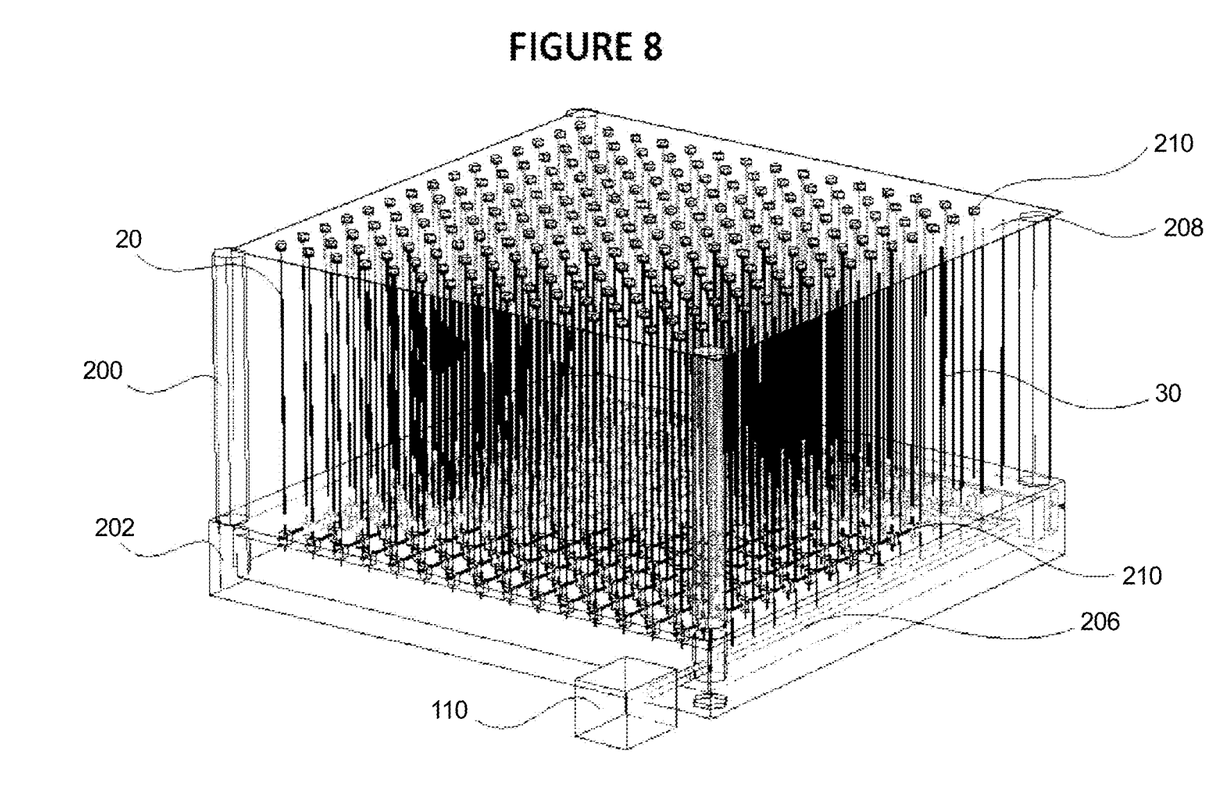
FIG. 8 illustrates an embodiment of a conductive charge collecting material, a conductive wire array, designed to be interlocked with a charge carrier element in a volumetric way.

FIG. 8 illustrates a diagram showing wire as the conductor with higher potential deployed volumetrically area as the collection array 30, conductive wire 20, is a fixed to insulating array frame 200, the insulating structure 202, and conductive wire, may alternately, be in the form of a microscopic circuit path (not shown) as in a microprocessor (not shown), in this embodiment it may be possible to have thousands of kilometres of conductive wire or paths, and millions of diode (not shown) or transistor (not shown) connections, such as in a microprocessor that may have hundreds of millions or billions of transistors present, and an insulating surface, which may consist of multiple insulating surfaces, as in a microprocessor (not shown). Insulating array frame 200, which may also be an insulating container (not shown), support the insulating wire support surface 208, positive charges collected through conductive wire 20, and travel through the conductive wire conduit 206, and out the collection interface 110, the conductive wire 20 is held in place with conductive wire mounting brackets 210.

The collection array 30, and diffusion array 32, uses conductive materials, and structures to greatly increase the surface area of a collection device, by continuously interlocking it with a conductive or charge carrier element, in a volumetric way, and creating structures within the volumetric area that can interlock with conductive or charge carrier elements, so as to maximize the interlocked surface area of the element and the arrays, for greater electromagnetic diffusion. Embodiments may consist of small microscopic solid segmented surfaces or conducting sheets, in a volumetric area less than a few square feet, or square inches or smaller, interlocked with a conductive element. The surface area is greatly expanded by sectioning the solid conductive material into conducting sheets. The conductive sheets are held and separated by insulating mounts, insulating mounts may be a semi-conductive material allowing for dual-purpose structural and current path, and are arranged on an insulating surface, which may also be a conductive contact point in which a human, or animal, or other conductive body makes contact with the device in order to greatly expand the volumetric energy collecting surface area.

The collection array 30, and diffusion array 32, are preferred to be made out of a low resistance conductive material such as carbon (graphene), silver, copper, annealed copper, gold, aluminum, calcium, tungsten, zinc, nickel, lithium, iron, platinum, tin, carbon steel, led, titanium, grain oriented electrical steel, manganin, constantan, stainless steel, mercury, nichrome, gaAs, carbon (amorphous), carbon (graphite), germanium, silicone, wood (damp), teflon, with the best results so far having been attained from pure copper.

In order to allow charges to flow the surfaces and structures need to be of electrically conductive material, which may be a paint or coating, and could be made from any microscopic, or not microscopic, open cells structures, or closed cells structures, or solid structures, or surfaces. Segmented surfaces may also be used, conductive gas, conductive particles, conductive particles suspended in liquid, conductive particles suspended in matter, or conductive particles suspended in gas. Conductive paint is an example of conductive particles suspended in a liquid that turns to a solid, as well as conductive sealant is also an example of a conductive particles suspended in a liquid that once it evaporates it turns into a solid. With the advancements in technology Conductive filament may be very advantageous to use in some circumstances. Non-metal conductive matter or non-conductive materials conductively plated can also be a good substitute, they may be conductively coated as well, or impregnated with conductive material.

Array options may also include magnetic or non-magnetic substances selected from the group consisting of metals, semi-metals, alloys, intrinsic or doped, inorganic or organic, semi-conductors. Other materials may include dielectric materials, layered materials, intrinsic or doped polymers, conducting polymers, ceramics, oxides, metal oxides, salts, organic molecules, cements, and glass and silicate which if made to allow the transfer of charges, or the conducting of charges could provide potential substitutes.

As well, a conductive structure may comprise a vast variety of options for a collection array 30, these may include a building and all of it's interior or exterior surfaces, which include roofs, walls, windows, ceilings, window frames, gutters, siding, insulation, drywall, fencing, furniture, flooring, doors, ducting, drapes, couch's, desks, tables, ottomans, shelving, beds, chairs, carpet, and may also include wire, electronic casings, rods, beams, or it's frame.

Particles, gases, liquids, sheets, foil and meshes may also be support structures. Human and animals as well as clothing could also be used as long as they are made to be conductive.

Vehicles may also be used as a collection array 30, and could include, airplanes, helicopters, flying cars, jets, rockets, spaceships, satellites, cars, trucks, vans, motorcycles, dump trucks, hauling trucks, blimps. Other support structures may include concrete, asphalt, roadways, bridges, overpasses, runways, train yards, wind turbines, solar panels, cell towers, radio towers, sails, drilling rigs, towers, masts, mobile buildings, platforms, billboards, water towers, skyscrapers, coliseums, roller coasters, hangers, cranes, arrays, space stations, living habitats, expandable arrays, conductively 3*d* printed structures, green houses, silos, exhaust stacks, a fixed or mobile structure, planets, moons, earth, and the ground, if made to be conductive.

The present invention is not limited to the description of the embodiments provided but may be altered by skilled person within the scope of the claims. An embodiment based on the proper combination of technical means disclose in different embodiments is encompassed in the technical scope of the present invention.

The blocks or, in particular, the control section of each of the diffusing circuits or the management system may be achieved through hardware logic or through software by using a CPU 86 as described. That is each management system and diffusing circuit 2, includes a CPU 86 central processing unit, which executes instructions from a program for achieving the corresponding function; a ROM read-only memory, in which the program is stored; a RAM random access memory, to which a program is loaded; a memory device recording medium such as memory, in which the program's various types of data are stored; and the like.

Moreover, the object of the present invention can be attained by mounting, to each of the diffusing circuits 2, a recording medium computer readably containing a program code to execute form program, intermediate code program, source program of software for achieving the offer mentioned function, in order for the computer CPU 86 or MPU memory processing 74 unit to retrieve and execute the program code recorded in the recording medium, through a non-limiting example of a system controller. Examples of the recording medium encompass: tapes, such as magnetic tapes and cassette tapes; discs include magnetic disk, such as floppy disks, and hard disks, flash drives, SD cards, any optional desks, such as a CD-ROMs, MOs, MDs, BBs, DVDs, and CD-Rs; cards, such as IC cards including memory cards and optical cards; and semiconductor memories, such as masks ROMs, EEPROMs, EEPROMs, and flash ROMs.

Further each of the management systems can be made connectable to a communications network so the program code can be supplied via the communications network. Examples of the communications network can include, but are not limited particularly to, the Internet, and intranet, and extranet, a LAN, ISDN, a VAN, a CATV communication network is not particularly limited. For example, it is possible to use, as a transmission medium, a cable such as a IEEE1394, a USB, a power line, a cable TV like, a telephone line, an ADSL line, etc. Alternatively, it is possible to use, as a transmission medium, a wireless system such as infrared rays as inlrDA and a remote controller, Bluetooth, 802.11 wireless, HDR, cellular phone network, satellite line, a terrestrial digital network, etc. It should be noted that the present invention can be achieved in the form of a computer data signal realized by electronic transmission of the program code and embedded in a carrier wave.

Further, the present invention can be expressed as follows: a management system according to the present invention is a management system for managing collecting energy, the management system being configured to include: a control means to control the overall control and operation of various components of the management system 1, a diffusion circuit charge collecting means for collecting charges from a diffusion circuit, potential differential creating means for creating a potential difference, a memory storage means to store information in memory, amount of solar radiation/temperature/atmospheric pressure acquiring means for acquiring an amount of solar radiation and/or temperature and/or atmospheric pressure; current/voltage acquiring means for acquiring an electric current value and/or voltage value, a computing section computing means to compute information and instructions, a target value setting means to set target values, search starting means to control searching, power system controlling means to control power system functions, estimating means to preform estimations, searching means for searching memory deriving means for deriving relational expression equations. Further, the memory section is configured to include a target value memory section, a memory section, and a relative relational expression equation section, a rated value database.

Further, the method according to the present invention for an managing system, is a control method for the management, and for controlling energy collection and output and characteristics, the method including, a target value setting input step, an oscillation frequency setting step, making a connection to a conductive material with a potential difference step, an activating charging circuit switches step, a collecting charges from a diffusion circuit step, a storing collected charges step, a deactivating charging circuit step, an activating output circuit with stored charges step, a step combining stored charges in series and parallel, a step of acquiring an electric current value and/or voltage value, an amount of solar radiation/temperature/atmospheric pressure acquiring step, a step of recording acquired information in the rated value database memory in appropriate sections, a step of computing and interpreting information based of recorded memory data, a step of forming instructions to send to system controller based on recorded memory data, set target values, and their relational effects to stored and discharged charges, a step of communicating information to the system controller for task execution based on the interpreted and set target values, a step of outputting power through a load based on set target values, relational estimations, and inputted commands.

The foregoing was intended as a broad summary only and only of some of the aspects of the invention. It was not intended to define the limits or requirements of the invention. Other aspects of the invention will be appreciated to one skilled in the art by reference to the detailed description of the preferred embodiment and to the claims. It is intended that all such additional systems, methods, aspects, and advantages be included with this description, and within the scope of the present disclosure, and be protected by the accompanying claims.

The terms used in this disclosure are not for limiting the inventive concept but for explaining the embodiments. The terms of a singular form may include plural forms unless otherwise specified. Also, the meaning of "include," "comprise," "including," or "comprising," specifies a property, a region, a fixed number, a step, a process, an element and/or a component but does not exclude other properties, regions, fixed numbers, steps, processes, elements and/or components. The reference numerals presented according to a sequence of explanations are not limited to the sequence.

In addition, some embodiments of the present disclosure may include patents or public disclosures already issued relating to this art, when used in conjunction with this system or method these prior schemes may be able to generate substantial amounts of usable power. By using the described system and method many of these previously failed schemes and inventions may be able to harvest enough continuous power to be potentially commercially viable, and when referring to these said inventions or schemes when combined with this disclosed system or method these devices should be considered new devices or improvements thereof and confer the protection of this disclosure, or future patent, this does not limit the scope of the present disclosure instead giving reference to where some embodiments of this discovery may fit into the art.

The invention claimed is:

1. A method of collecting, managing, and discharging energy, the method comprising:
controlling, by a managing device, a diffusion circuit that is electrically connected to the managing device, the managing device being operable to control, in operation, energy collection, energy storage, energy discharge, and energy storage discharge oscillation cycle frequency, wherein:
a first electrically conductive material of the diffusion circuit is exposed to a first potential of an electric field and a second electrically conductive material of the diffusion circuit is exposed to a second, different potential of the electric field, causing charges to migrate via at least one conductive wire connected to the first electrically conductive material and at least one other conductive wire connected to the second electrically conductive material; and
the diffusion circuit is electrically connected to a load; and
wherein the managing device:
collects said energy by electrically connecting the first and second electrically conductive materials to a capacitor via a bridge rectifier and one or more switches;
stores said energy by isolating the capacitor; and
discharges said energy by electrically connecting the capacitor to the load via one or more additional switches;
wherein the one or more switches and one or more additional switches comprise a rotary collecting, managing and discharging switch, comprising a rotary commutator switch, commutator brush assemblies and a commutator housing such that the commutator brush assemblies are electrically connected to input and output leads of the capacitor, and to positive and negative leads of the bridge rectifier; such that the rotary commutator switch is operable to control said energy storage discharge cycle oscillation frequency and a charge cycle followed by a discharge cycle.

2. The method of claim 1, wherein the diffusion circuit comprises said bridge rectifier, and wherein the diffusion circuit additionally comprises one or both of a collection array interface and a diffusion array interface, said one or both of the collection array interface and the diffusion array interface being electrically connected to said bridge rectifier.

3. The method of claim 1, wherein the managing device:
dictates said energy storage discharge oscillation cycle frequency via a central processing unit (CPU) and a system controller;
regulates power;
searches for relative relational expression equations in a memory section via a search control section of the CPU;
acquires measurement data via a measurement data acquiring section of the CPU, which includes environmental data and electric power data, the environmental data being measured values of an environment surrounding the managing device, and the electric power data representing information associated with electric power that is outputted from the diffusion circuit and other diffusion circuits;
derives a relational equation that holds between the environmental data and the electric power data to maintain target values including voltage and current output;
determines whether or not the managing device or any of said diffusion circuits are in an abnormal state by comparing the measured values with measured values from a measurement data memory storage section; and
selects, in accordance with a determination of the abnormal state, a procedure for managing any of said diffusion circuits.

4. The method of claim 1, wherein the diffusion circuit comprises a conductive tire that is at least one of conductively coated, conductively impregnated, or made of a material that is conductive, such that the conductive tire comprises the second electrically conductive material.

5. The method of claim 1, wherein:
the first electrically conductive material is interlocked with a charge carrier or conductive element; and
the first electrically conductive material is sectioned into conducting sheets, which are held and separated by insulating mounts.

6. A system for collecting, managing, and discharging energy, the system comprising:
a managing device configured to control a diffusion circuit;
the diffusion circuit, which is electrically connected to the managing device and includes a first electrically conductive material exposed to a first potential of an electric field and a second electrically conductive material exposed to a second, different potential of the electric field, causing charges to migrate via at least one conductive wire connected to the first electrically conductive material and at least one other conductive wire connected to the second electrically conductive material, a capacitor, a bridge rectifier, one or more switches and one or more additional switches;
wherein the managing device is for controlling energy collection, energy storage, energy discharge and energy storage discharge oscillation cycle frequency, in operation; and
wherein a load is electrically connected to said diffusion circuit; wherein the managing device:
collects said energy by electrically connecting the first and second electrically conductive materials to the capacitor via the bridge rectifier and the one or more switches;
stores said energy by isolating the capacitor; and
discharges said energy by electrically connecting the capacitor to the load via the one or more additional switches;
wherein the one or more switches and one or more additional switches comprise a rotary collecting, managing, and discharging switch, comprising a rotary commutator switch, commutator brush assemblies, and a commutator housing, wherein the commutator brush assemblies are electrically connected to input and output leads of the capacitor, and to positive and negative leads of the bridge rectifier; wherein the rotary commutator switch is operable to control the energy storage discharge oscillation cycle frequency and a charge cycle followed by a discharge cycle.

7. The system of claim 6, wherein the diffusion circuit additionally comprises one or both of a collection array interface and a diffusion array interface, said one or both of the collection array interface and the diffusion array interface being electrically connected to said bridge rectifier.

8. The system of claim 6, wherein the second electrically conductive material is a conductive tire that is at least one of conductively coated, conductively impregnated, or made of a material that is conductive.

9. The system of claim 6, wherein the first electrically conductive material is interlocked with a charge carrier or conductive element, and the first electrically conductive material is sectioned into conducting sheets, which are held and separated by insulating mounts.

* * * * *